No. 623,982. Patented May 2, 1899.
A. W. CHESTERTON.
GASKET FOR STEAM BOILERS AND COUPLING THEREFOR.
(Application filed June 3, 1898.)

(No Model.)

Witnesses
Inventor
Archer W. Chesterton.

UNITED STATES PATENT OFFICE.

ARTHUR W. CHESTERTON, OF BOSTON, MASSACHUSETTS.

GASKET FOR STEAM-BOILERS AND COUPLING THEREFOR.

SPECIFICATION forming part of Letters Patent No. 623,982, dated May 2, 1899.

Application filed June 3, 1898. Serial No. 682,510. (No model.)

*To all whom it may concern:*

Be it known that I, ARTHUR W. CHESTERTON, of Boston, county of Suffolk, State of Massachusetts, have invented certain new and useful Improvements in Gaskets for Steam-Boilers and Couplings Therefor, of which the following is a description.

Figure 1:
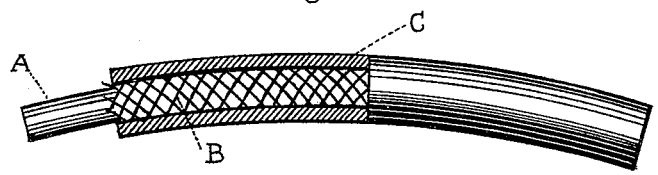
Figure 2:
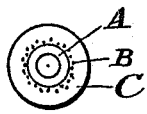
Figure 3:
Figure 4:
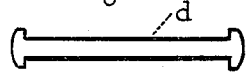
Figure 5:
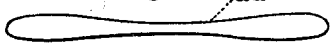
Figure 6:
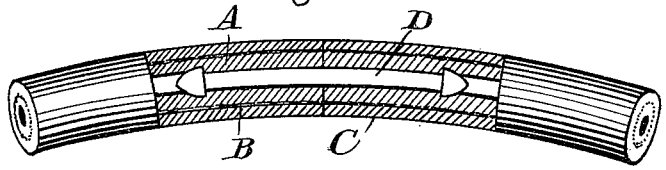

The accompanying drawings show the gasket and coupling in several different forms.
Figure 1 shows an exposed section of the gasket. Fig. 2 shows a cross-section of the gasket. Figs. 3, 4, and 5 show the coupling in the varying shapes in which it may be made. Fig. 6 shows a section of the gasket with the coupling in place.

My invention relates to an improvement in that class of joint and steam-boiler gaskets usually made with a hollow core, the ends being coupled together.
My improvement consists chiefly in the material of which the gasket is composed, being a metallic body surrounded with suitable materials to resist heat, and in the style of couplings used.
I find that a gasket made with a center of woven, twisted, or braided wire (preferably of woven wire) and having a compound of asbestos ground and thoroughly incorporated with rubber coated and laid on each side of the metallic body to give it elasticity and to cause it to conform itself more perfectly to the uneven surfaces of the joint makes a more suitable gasket and will resist the pressures of steam better than gaskets as heretofore made.

B, Fig. 1, represents the metallic body which I would use as the center of my gasket; A, the inside coating of the compound before mentioned; C, the outer coating. These compounds could be rolled onto the metallic body and the gasket afterward rolled into tubular form, or it could be made into tubular form in any other or more convenient manner, as may suggest itself.
I also find that a solid coupling made larger in diameter at or near its ends than in its center will from its shape be held in its position by the pressure of the joints. This coupling may be made in several shapes, such as shown in Figs. 3, 4, and 5 of the accompanying drawings, and in other shapes which may vary from these particular kinds shown, without departing from the principle.

Heretofore in using tubular gaskets it has been found necessary to wind the ends of the gasket after being joined together with the coupling used with a piece of rubber tape. With the use of my improved coupling this will not be necessary, as the pressure of the joints when brought together will cause the gasket to be forced onto the smaller part of the coupling—D, Fig. 3; *d*, Fig. 4; *d d*, Fig. 5—and so prevent it from being forced out, and thus a tape will not be necessary to hold the ends of the gasket together.

My coupling being made solid and not hollow, as couplings have heretofore been made, will retain its shape better under pressure and better adapt itself to the shape of the gasket.

Having fully described my invention, what I claim as new, and desire to secure by Letters Patent, is as follows:

1. A hollow gasket in cylindrical, elliptical, or rectangular form, made of woven, twisted, or braided wire, and covered on both sides with a compound consisting of rubber and asbestos.

2. A gasket in cylindrical, elliptical, or rectangular form made of woven, twisted, or braided wire, and covered on both sides with a compound of rubber and asbestos, the gasket being made hollow so as to receive a coupling which shall join its ends together.

3. A solid metallic coupling for tubular gaskets made in the form of the printed English capital letter I, or in any form so that the diameter of the coupling will be larger at or near its ends than at its center.

ARTHUR W. CHESTERTON.

Witnesses:
GEORGE L. SWETT,
CHARLES B. DEVEREAUX.